United States Patent [19]

Payne

[11] Patent Number: 4,702,848
[45] Date of Patent: Oct. 27, 1987

[54] CONTROL OF CROSSLINKING REACTION RATE USING ORGANOZIRCONATE CHELATE CROSSLINKING AGENT AND ALDEHYDE RETARDING AGENT

[75] Inventor: Kathryn L. Payne, Houston, Tex.

[73] Assignee: Dowell Schlumberger Incorporated, Houston, Tex.

[21] Appl. No.: 794,375

[22] Filed: Nov. 4, 1985

Related U.S. Application Data

[63] Continuation-in-part of Ser. No. 593,377, Mar. 26, 1984, Pat. No. 4,579,670.

[51] Int. Cl.$^4$ .......... B01J 13/00; C09K 3/00; E21B 43/26
[52] U.S. Cl. .......... 252/8.551; 166/308; 252/315.3
[58] Field of Search ........... 166/308; 252/8.55 R, 252/315.3, 8.551

[56] References Cited

U.S. PATENT DOCUMENTS

| 3,301,723 | 1/1967 | Chrisp | 252/315.3 |
| 3,898,165 | 8/1975 | Ely | 252/8.55 R |
| 4,336,145 | 6/1982 | Briscoe | 252/8.55 R |
| 4,477,360 | 10/1984 | Almond | 252/8.55 R |
| 4,488,975 | 12/1984 | Almond | 252/8.55 R |
| 4,552,215 | 11/1985 | Almond et al. | 166/278 |
| 4,553,601 | 11/1985 | Almond et al. | 166/308 |
| 4,579,670 | 4/1986 | Payne | 252/8.55 R |

Primary Examiner—Dennis Albrecht
Attorney, Agent, or Firm—Prevel, Gambrell, Hewitt, Kimball & Krieger

[57] ABSTRACT

An aqueous gel containing a crosslinking agent comprising an organozirconate chelate and a rate retarding agent which delays crosslinking of the gel or a rate accelerating agent which accelerates crosslinking of the gel. The retarding agent comprises a selected aldehyde or dialdehyde. The accelerating agent comprises a member selected from a group of polyamines. In the preferred embodiment, the crosslinking agent and crosslinking rate retarder or accelerator are injected simultaneously, yet independently, into an aqueous gel while introducing the gel into a subterranean formation sought to be fractured. The viscosity of the gel increases over a period of time which is controllable by altering the quantity of rate retarding agent or accelerating agent delivered in conjunction with a fixed concentration of crosslinking agent.

10 Claims, 6 Drawing Figures

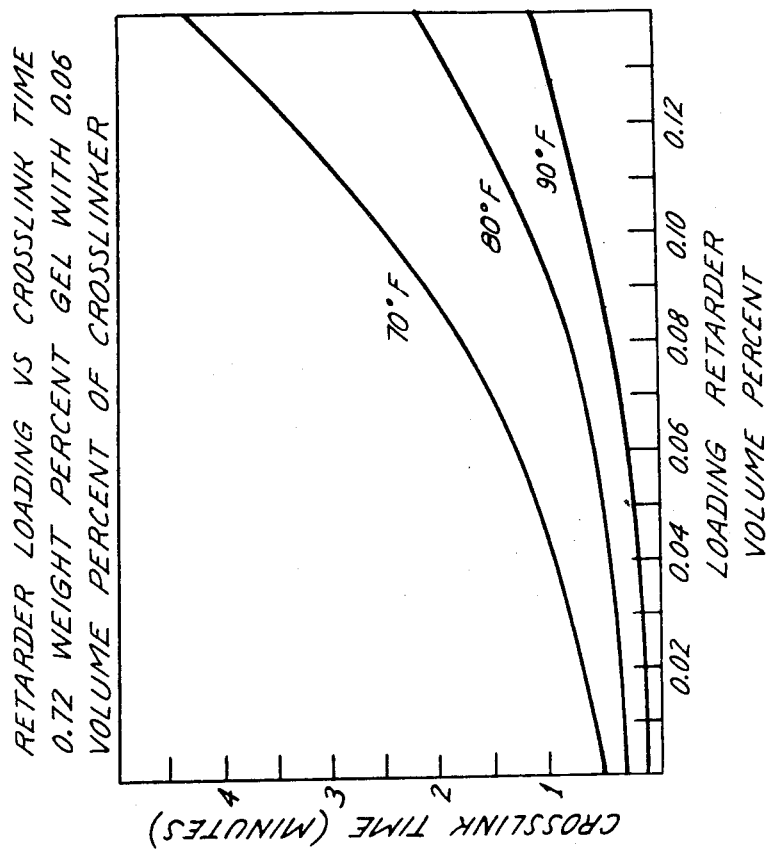
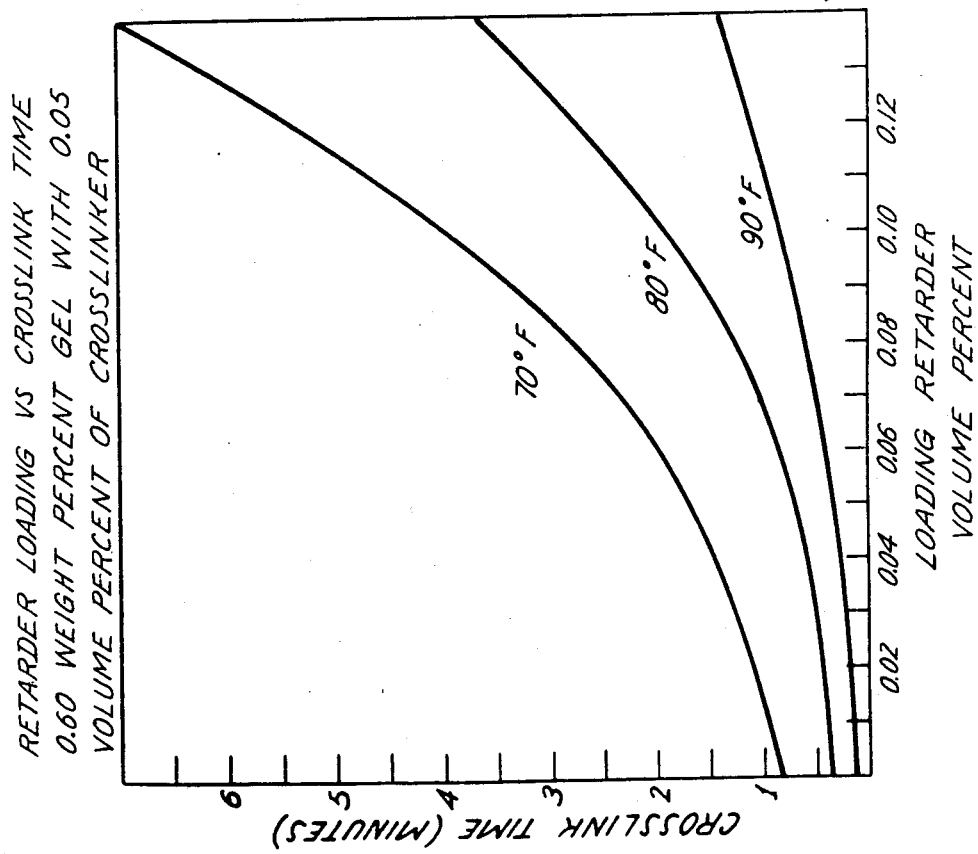

CONTROL OF CROSSLINKING REACTION RATE USING ORGANOZIRCONATE CHELATE CROSSLINKING AGENT AND ALDEHYDE RETARDING AGENT

This application is a continuation-in-part of Ser. No. 593,377 filed Mar. 26, 1984 now U.S. Pat. No. 4,579,670.

FIELD OF THE INVENTION

The present invention relates to a method and composition for fracturing a subterranean formation penetrated by a well bore wherein an aqueous gel having controllable crosslinking reaction properties is introduced into the formation at a rate and pressure sufficient to fracture the formation.

BACKGROUND OF THE INVENTION

The intent of hydraulic fracturing used for well stimulation is to increase well productivity by creating a highly conductive path (relative to formation permeability) through which hydrocarbons may flow. The fracture is initiated by pumping a suitable fluid, with or without proppant suspended therein, into the formation at a sufficient rate to overcome the earth's compressive forces.

As injection of a fracturing fluid containing a propping agent continues, the proppant is placed within the fractured zone. After completion of the fracturing treatment, the fluid is recovered from the formation and the proppant remains to hold the fracture faces apart.

A fracturing fluid is pumped into a well bore through a conduit like tubing or casing which may range from $2\frac{7}{8}$ to 7 inches in diameter. The pumping equipment and tubular goods are limited by specific safety and pressure requirements which can be prohibitive. If the wellhead pressure and hydraulic horsepower required to overcome both the earth's compressive forces and friction loss exceed pump capacity and/or tubular conduit strength, a fracturing fluid of desirably high viscosity cannot be injected at a sufficient rate to effectively open a fracture. It is therefore desirable that the viscosity of the fluid be initially low enough that excessive friction losses and high wellhead pumping pressures are not encountered, yet ultimately high enough to produce a fracture in the formation.

In conventional hydraulic fracturing applications where high viscosity is desired, crosslinking compounds are mixed with aqueous solutions containing hydratable polysaccharides such as galactomannan gums, glucomannan gums, and cellulose derivatives. Most appropriate cross-linking compounds provide metal ions which crosslink polymer strands through available ionic sites. Cross-linking can occur through hydroxy, amino, amido, carboxyl, and thio groups although the hydroxy crosslinking reaction occurs most readily. The crosslinking reaction of a common guar derivative such as hydroxypropyl guar with a frequently used crosslinking agent like triethanolamine titanate generally occurs within seconds. This reaction increases viscosity by several orders of magnitude.

Two potentially undesirable characteristics may be correlated with the immediate increase in viscosity associated with conventional crosslinked systems. As viscosity increases, frictional pressure increases; thus, rapid viscosity development dramatically affects operating pressure. Gels are subject to shear as they pass through pumping equipment and tubular goods. Introducing shear to a completely crosslinked gel, i.e. a gel which has attained full viscosity, can result in a disruption of the crosslinked structure structure which can reduce the ultimate stability of the crosslinked gel.

Conway U.S. Pat. Nos. 4,502,967 and 4,470,915 teach a means for delaying crosslinking reactions by admixing predetermined quantities of retarding agent and crosslinking agent such that a retarded crosslinking composition is formed which in itself provides a delayed crosslinking reaction. This method requires production of retarded crosslinking compositions having preselected properties controlled by the volumetric ratios of crosslinking compound to retarding agent, and the time and temperature of the aging period following blending. Acceptable retarding agents for such applications include polyhydroxycarboxylic acids having 3 to 7 carbon atoms and polyhydroxyl-containing compounds. Polyhydroxyl-containing compounds may also be batch mixed in predetermined amounts with the base gel prior to the addition of a crosslinking agent, Hollenbeak U.S. Pat. No. 4,464,270. The base gel containing the retarding agent is introduced into the wellbore in admixture with a crosslinking agent. Crosslinking agents for use with gels containing batch mixed retarding agents or crosslinker/retarder blends are organotitanates.

Batch-mixing crosslinking rate controllers or premixing crosslinker/retarder blends provide minimal flexibility. Batch-mix processes and premixed blends generally necessitate estimating a desire crosslinking reaction time prior to pumping. In batch-mixing procedures, the quantity of rate retarder may vary according to the common fluid variables. Consequently, the required amount of the crosslinking rate controller must be determined for each individual tank of fracturing fluid and the addition of that amount must be meticulously controlled. After a rate controller has been added, any unforeseen changes in fluid conditions such as changes in surface temperature, viscosity or pH can cause corresponding variations in crosslinking reaction times.

Crosslinker/rate controller blends must also be mixed before injection of the fracturing fluid. A desired crosslinking time is chosen and either one crosslinker/rate controller blend is prepared which provides an average crosslinking reaction time over a range of fluid variables or several blends are prepared to compensate for changes in fluid composition. Again unforeseen changes in fluid conditions can cause changes in crosslinking times for which compensation is difficult after crosslinker/rate controller blends have been prepared.

Due to the difficulties in the application of batch-mixed processes and crosslinker/rate controller blends, it is preferable in the practice of the present invention to deliver the crosslinking agent and crosslinking rate controller simultaneously while pumping the fracturing fluid into the wellbore. By simultaneously injecting the two components, the crosslinking reaction rate can be monitored throughout the fracturing operation and the quantity of rate controller may be altered if necessary to compensate for changing conditions.

The method of the present invention employs aldehydes and dialdehydes as retarding agents and organozirconates as crosslinking agents. The invention further extends the users' ability to control crosslinking time by providing a crosslinking rate accelerator comprising polyamines. Crosslinking rate retarders or accelerators in the preferred practice of the invention are injected into the gel simultaneously with, yet independently of, the crosslinking agent while pumping the fluid into the formation.

SUMMARY OF THE INVENTION

The present invention provides a means by which friction loss problem's, excessive shear of the crosslinked fluid, and the unpredictability of delayed crosslinking reactions are overcome.

According to the present invention, an aqueous gel is provided comprising an aqueous fluid, a gelling agent, a crosslinking agent, and a crosslinking reaction rate controller which is either a reaction accelerating agent or a reaction retarding agent. In laminar flow, the crosslinked aqueous gel yields non-Newtonian viscosity ranging from 100 to in excess of 2000 centipoises at a shear rate of 170 sec$^{-1}$. The period of time required to reach the viscosity range stated above is hereinafter referred to as the crosslinking time or crosslinking reaction rate. Crosslinking times may be designed such that viscosity is achieved at any point between 0.01 minutes and 60 minutes.

It is an object of the present invention to provide a chemical method for controlling the crosslinking reaction time so as to decrease horsepower requirements, decrease frictional pressures, and to minimize the shear force effects during pumping upon a fracturing fluid in the crosslinked state.

It is an object of the present invention to provide a method by which the crosslinking reaction time may be specified and achieved within seconds after addition of the crosslinking agent, or at some point following crosslinker injection but prior to entry into the casing or tubing, or at some point following entry into the tubing or casing but prior to entry into the formation. Likewise, crosslink times may be controlled so that crosslinked gel viscosity is achieved as the fracturing fluid enters the formation or after entering the fractured zone.

It is an object of the present invention to provide a method for adjusting; the concentrations of crosslinking rate controllers so that specified crosslinking reaction times may either be maintained in spite of fluid variables or be altered to compensate for unforeseen circumstances while pumping the fluid into the wellbore.

An aqueous gel may be prepared by mixing a predetermined quantity of the hydratable polysaccharide gellant with a given quantity of aqueous liquid. Any suitable batch mixing apparatus may be used for this mixing procedure. For batch mixing, the gelling agent and aqueous liquid should be blended for a period of time which is sufficient to form a hydrated gel. The hydrated gel, or "base gel", is introduced into a wellbore while a predetermined quantity of crosslinking agent is mixed with the hydrated gel simultaneously with a quantity of crosslinking rate controller sufficient to achieve a desired crosslinking reaction time. The crosslinking reaction takes place as the a mixture is pumped into the wellbore. Propping agents, if required, are generally added to the hydrated gel prior to the addition of the crosslinking agent.

The rate at which the crosslinking reaction occurs depends on the quantity of rate accelerator or rate retarder employed. The concentration of the crosslinking rate accelerator or the crosslinking rate retarder is continuously controlled to respond to changes in conditions that affect the crosslinking reaction. Examples of such conditions or variables which might affect crosslinking reaction time are surface temperature, polymer concentrations, salt concentrations, buffer types and concentrations, surfactant types and concentrations, fluid loss additives, mutual solvents, alcohol, and pH.

In the practice of the present invention, a crosslinking rate accelerator or crosslinking rate retarder is admixed with the hydrated gel independent of, yet simultaneously with the crosslinking agent while introducing the gel through a conduit into a subterranean formation sought to be fractured. In tandem with a fixed crosslinker concentration, variable concentrations of a crosslinking rate controller are injected into the gel to either accelerate or retard the action of the crosslinker upon the gelling agent, wherein the extent of delay or acceleration is dependent on the concentration of the rate controller. The crosslinking agent and rate controlling agent are not necessarily combined prior to their admixture with the hydrated gel, instead each is introduced to the hydrated gel through a separate mechanical delivery system which allows independent adjustment of the delivery rate and thus concentration of crosslinker and rate controller.

With the method of the present invention, crosslinking of the gelling agent occurs over a period of time resulting in a gradual increase in viscosity. In other words, a gelling agent solvated in an aqueous fluid provides a "base gel" viscosity which begins to increase upon the injection of a crosslinking agent. The rate with which viscosity increases following the addition of the crosslinking agent is controlled by adding either a rate retarder, which retards the development of viscosity over a specified period of time, or a rate accelerator, which accelerates the development of viscosity over time. Although heat tends to accelerate the reaction, heat is not required to initiate the crosslinking reaction of the present invention.

Crosslinking times may be designed such that viscosity develops during any time period ranging from 0.01 minutes to 60 minutes in length wherein the crosslinked gel viscosity in the range of 100 to 2000 centipoises at 170 sec$^{-1}$ is attained at the end of a specified period. The specified crosslinking time thus encompasses the period of time during which viscosity gradually increases and ends at the time at which gel viscosity reaches approximately 100 to 2000 centipoises.

BRIEF DESCRIPTION OF THE DRAWINGS

FIG. 5 is a graph of retarder loading versus crosslinker reaction time for a gel containing 0.60 weight percent gelling agent and 0.05 volume percent crosslinker.

FIG. 6 is a graph of retarder loading versus crosslinking times for a fluid containing 0.72 weight percent gellant and 0.06 volume percent crosslinking agent.

DETAILED DESCRIPTION OF THE PRESENT INVENTION

Figure 2:
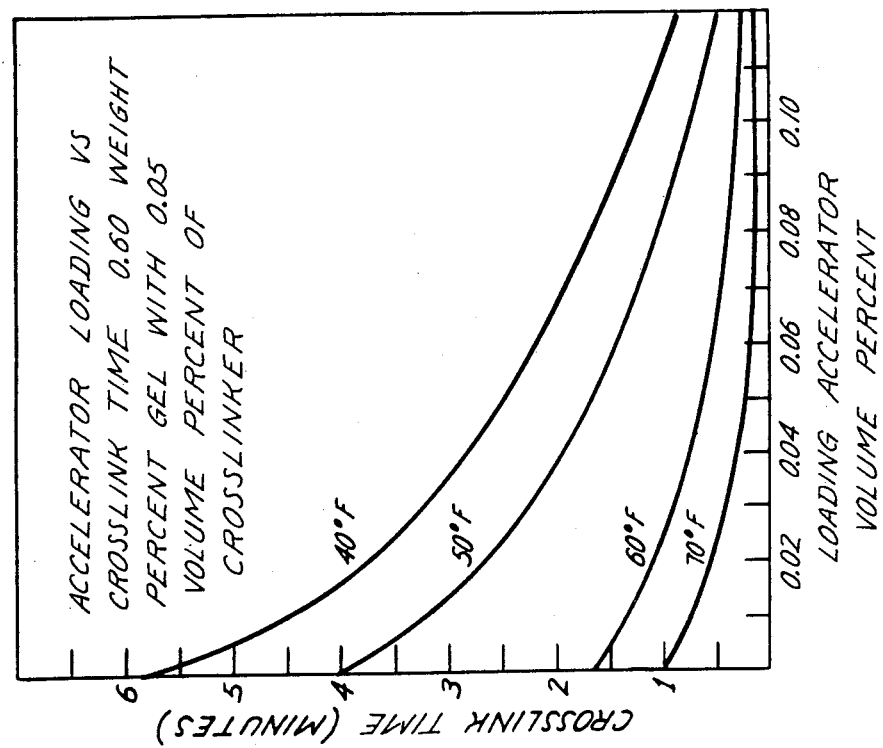
FIG. 2 is a graph of accelerator loading versus crosslinking times for a fluid containing 0.60 weight percent gellant and 0.05 volume percent crosslinking agent.

The aqueous liquid described herein is used to solvate the gelling agent prior to crosslinking. It may contain various additives common to the well services industry such as alcohol, surfactants, pH-control agents, biocides, oxygen scavengers, and salts.

Appropriate gellants for the present invention include hydratable polysaccharides such as the galactomannan gums, glucomannan gums, and cellulose derivatives. Suitable polysaccharides include guar gum, cationically substituted guar, hydroxypropyl guar, carboxymethyl hydroxypropyl guar, hydroxybutyl guar, carboxymethyl cellulose, carboxymethyl hydroxyethyl cellulose, and hydroxyethyl cellulose. The preferred gelling agents are guar gum, hydroxypropyl guar, carboxymethyl hydroxypropyl guar, cationic guar and carboxymethyl hydroxyethyl cellulose. The most preferred gellant for the present invention is hydroxypropyl guar.

The gelling agent should be added to the aqueous liquid in concentrations ranging from 0.30% to 2.00% by weight of the aqueous liquid. The most preferred range for the present invention is 0.36% to 0.72% by weight.

The pH of the aqueous liquid or aqueous liquid/polysaccharide mixture may be adjusted to a desired level by acids, acid buffers, mixtures thereof, or mixtures of acids and bases. Typical examples of chemicals used for the purpose of adjusting pH include hydrochloric acid, fumaric acid, acetic acid, adipic acid, potassium biphthalate, sodium hydrogen fumarate, sodium acetate, sodium diacetate, sodium dihydrogen citrate, ammonium acetate, sodium bicarbonate and sodium carbonate. Control of the crosslinking reaction rate may be accomplished over a broad pH range, however, the preferred pH range for the present invention is from about 7 to about 13.

Acceptable crosslinking agents include zirconium lactate, zirconium diisopropylamine lactate, zirconium triethanolamine lactate, zirconium acetylacetonate, and zirconium ammonium carbonate. The amount of crosslinking agent useful for crosslinking the gelling agent is that which supplies a zirconium ion concentration in the range from about 0.0001 percent to in excess of about 0.0100 percent by weight of the aqueous fluid. The concentration of zirconium ions which provides optimum gel characteristics, thermal stability and durable viscosity, can be experimentally determined for dissimilar base gel formulations. Base gel formulations differ by types and concentrations of gelling agents, salts, buffers, surfactants, fluid loss additives, and other additives common to the well services industry.

The optimum loading of crosslinking agent alone provides a natural crosslinking reaction rate which is sensitive to changes in the temperature and components of the base gel. If the "natural" crosslinking rate is undesirably slow or fast it may be adjusted by adding rate accelerating or retarding agents without changing the optimum crosslinker delivery.

The rate of the crosslinking reaction may be accelerated by the addition of polyamines. Suitable polyamines for accelerating the crosslinking time include tetramethylenediamine, triethylenetetramine, tetraethylenepentamine, diethylenetriamine, triethylenediamine, triethylenepentamine, N,N'-diethy-1,4-pentanediamine, ethylenediamine, N,N'-diethyl ethylenediamine, 1,5,9,13-tetraazatridecane, 1,5,8,12-tetraazadodecane, and hexamethylenediamine. These and similar polyamines may be utilized in concentrated form or may be diluted with a suitable solvent such as water or alcohol. The crosslinking rate accelerator is used at a sufficient loading level to achieve the desired crosslinking rate wherein higher loadings result in faster crosslinking times. Loading levels can vary according to the temperature, gellant concentration, pH, salt content, and other aforementioned variables. Typical loadings for a concentrated crosslinking rate accelerator range from about 0.001% to about 0.6% by volume of the fracturing treatment fluid.

The crosslinking reaction rate may be retarded by the addition of various aldehydes including dialdehydes. Suitable rate retarders include formaldehyde, acetaldehyde, methylacetaldehyde, butyraldehyde, and glyoxal. The retarding agent is applied at a concentration sufficient to achieve the desired reaction rate. As the amount of retarder added to the gel is increased the crosslinking time lengthens. Typical loadings for a concentrated crosslinking rate retarder range from about 0.001% to about 0.600% by volume of the fracturing fluid. For ease of handling, the retarding agent may be diluted with a suitable solvent such as water or alcohol.

For the sake of quality control, the optimum crosslinking ion concentration should be maintained, inasmuch as mechanical delivery systems allow, throughout the fracturing operation. Consequently, crosslinking reaction time control achieved while pumping the fracturing fluid into the wellbore is most desirable when achieved without altering the concentration of metallic crosslinking ions.

In the practice of the present invention, crosslinker and crosslinking rate controller are injected simultaneously with the introduction of the fracturing fluid into the wellbore, so that the concentration of rate accelerator or rate retarder can be independently adjusted in response to fluid variables and/or changing surface conditions. Fluid variables stem from differences in gellant loadings, buffers, salt contents, surfactants, oxygen scavengers, fluid loss additives and reducing agents, each of which may influence the crosslinking reaction rates. The ability to adjust freely to these variables, with the capacity to either accelerate or decelerate crosslinking, is important.

For example, fracturing fluid formulations are often "tapered" such that the strongest, most stable gel is introduced into the formation first. To accomplish this, fracturing operations may begin with a base gel containing 50 pounds gellant per 1000 gallons of aqueous fluid and move to a base gel containing 40 pounds gellant per 1000 gallons of aqueous fluid later in the operation. Further complicating the issue are fluctuations in the concentrations of surfactants, fluid loss additives, gel stabilizers and other common additives which tend to influence crosslinking reaction rates. If preblended compositions of retarding agent/base gel or retarding agent/crosslinking agent are utilized, it is conceivable that several different mixtures would be required to maintain a specified crosslinking reaction rate, and few options would be available for altering crosslinking times during the fracturing operation.

Another potential variation in the crosslinking reaction rate stems from changes in temperature. Increases in temperature accelerate the crosslinking reaction and decreases in temperature retard the reaction rate. A 10° F. drop in the temperature of a gel can double the time required for crosslinking while a 10° F. increase in gel temperature can halve the reaction rate. Temperature changes may be due to unpredictable variations in the weather or inconsistent artificial heating techniques often employed during cold winter months. The quantity of crosslinking rate controller needed to achieve a preselected crosslinking time is subject to variations in base gel temperatures.

Figure 1:
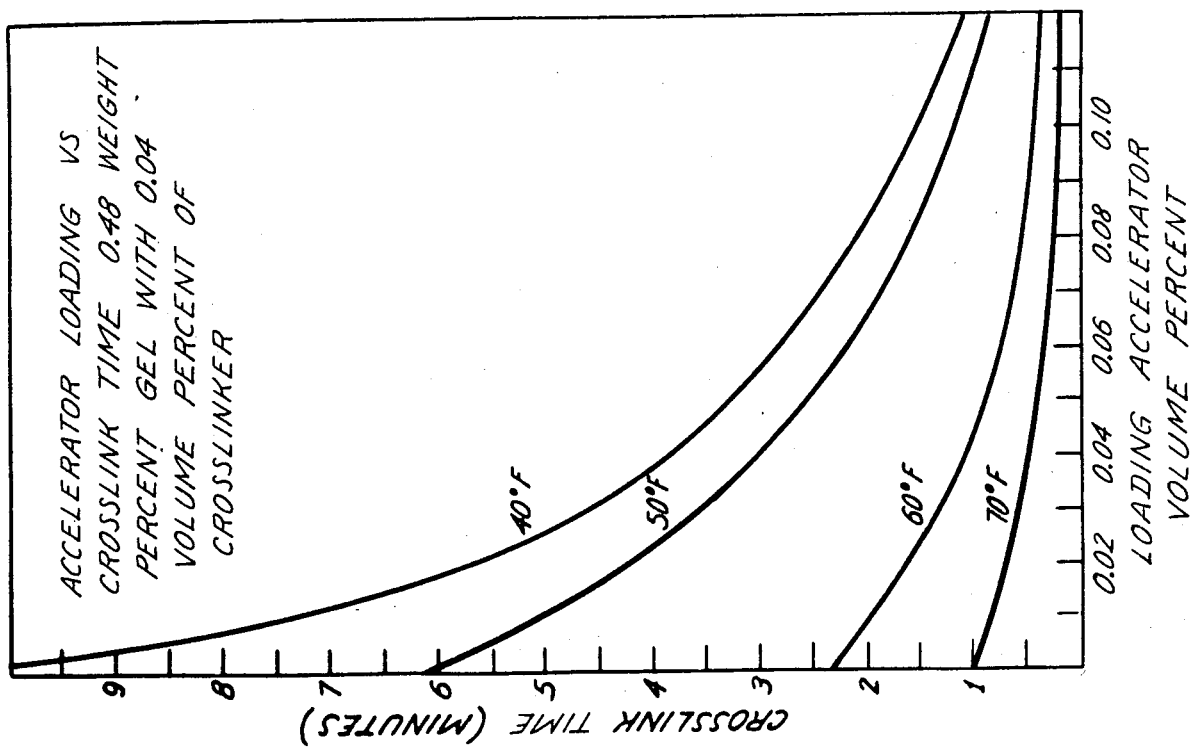
FIG. 1 is a graph of accelerator loading versus crosslinking reaction times for a fracturing fluid containing 0.48 weight percent gelling agent and 0.04 volume percent crosslinker.
Figure 3:
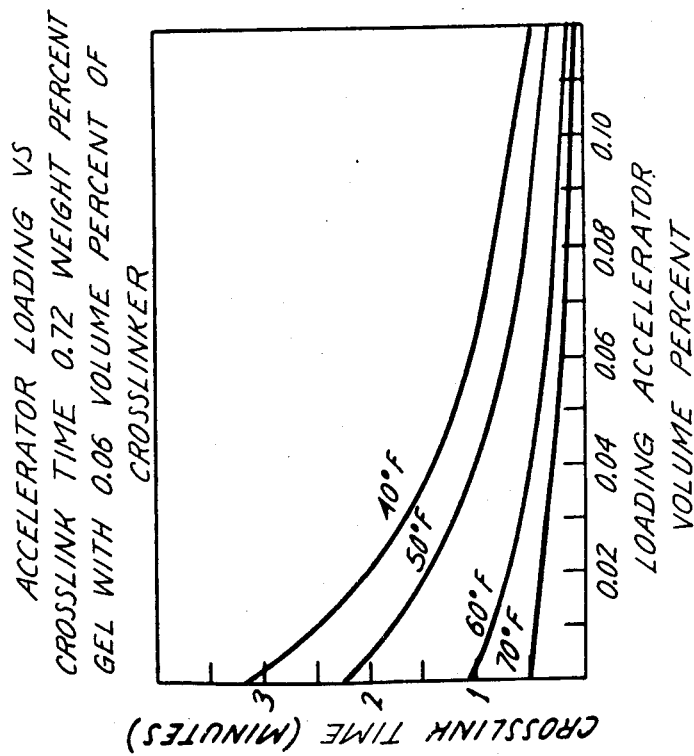
FIG. 3 is a graph of accelerator loading versus crosslinking times for fracturing fluids containing 0.72 weight percent gellant and 0.06 volume percent crosslinking agent.

FIGS. 1, 2, and 3 show the acceleration of crosslinking times in fracturing fluids respectively containing 0.48 percent, 0.60 percent, and 0.72 percent gelling agent by weight as the loading of crosslinking rate accelerator is increased. The graphs are representative of the trends in crosslinking times given by aqueous solutions of the previously listed polyamines wherein 45% of the dilute solution is a polyamine.

The differences in crosslinking times at various temperature levels are made evident by separate curves representing crosslinking reaction times at 40° F., 50° F., and 70° F. with increasing volume increments of a rate accelerator. A comparative study of FIGS. 1, 2, and 3 also displays the shifts in crosslinking times caused by changes in gellant and crosslinker loadings.

Figure 4:
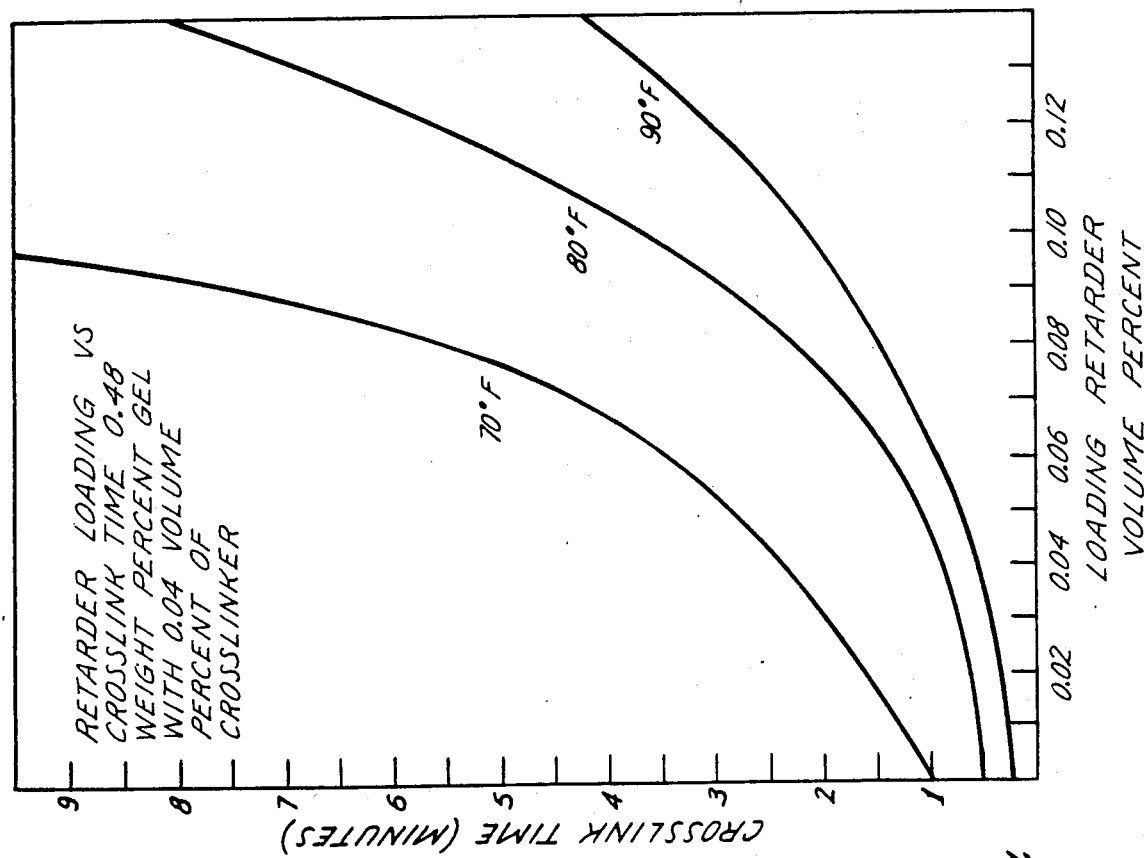
FIG. 4 is a graph of retarder loading versus crosslinking reaction time for a fracturing fluid containing 0.48 weight percent gelling agent, and 0.04 volume percent crosslinking agent.

FIGS. 4, 5, and 6 show the extension of crosslinking times in fracturing fluids respectively containing 0.48 percent, 0.60 percent, and 0.72 percent gellant by weight as the loading of a crosslinking rate retarder is increased. The graphs are representative of the trends given by aqueous solutions of the aforementioned crosslink retarding chemicals.

The shifts in crosslinking reaction times caused by temperature changes are displayed by separate curves representing the data gathered at 70° F., 80° F., and 90° F.

The data in FIGS. 1 through 6 was generated in experiments with the preferred polysaccharide, hydroxypropyl guar; the preferred crosslinker, zirconium lactate; the preferred accelerator, ethylenediamine and the preferred retarder glyoxal.

It should be understood that the foregoing description is not intended to be limiting but is only exemplary of the inventive features which are defined in the claims.

What is claimed is:

1. A process for fracturing a subterranean formation penetrated by a wellbore which comprises:
   preparing a base gel by mixing an aqueous fluid with a gelling agent selected from hydratable polysaccharides having a molecular weight in excess of 100,000 said gelling agent being present in an amount sufficient to gel said aqueous fluid;
   introducing said base gel into said wellbore in admixture with a crosslinking agent and retarding agent, said crosslinking agent comprising an organozirconate chelate present in an amount sufficient to crosslink said gelling agent, and said aldehyde retarding agent present in an amount sufficient to retard the action of said crosslinking agent upon said gelling agent;
   permitting said base gel to react with said crosslinking agent over a controllable period of time to form a crosslinked gel wherein the period of time over which the crosslinking reaction occurs is controllable by altering the amount of said retarding agent admixed with said base gel; and
   introducing said crosslinking gel into said formation from said wellbore at a flow rate and pressure sufficient to fracture the said formation.

2. The process of claim 1, wherein said aldehyde retarding agent is selected from a group consisting of dialdehydes, formaldehyde, acetaldehyde, methylacetaldehyde, butyraldehyde, and glyoxal.

3. The process of claim 1, wherein said hydratable polysaccharide is selected from the group consisting of guar gum, hydroxypropyl guar, cationically substituted guar, carboxymethyl hydroxypropyl guar, hydroxybutyl guar, carboxymethyl cellulose, carboxymethyl hydroxyethyl cellulose, and hydroxyethyl cellulose present in concentrations ranging from about 0.30 percent to about 2.00 percent by weight of said aqueous fluid.

4. The process of claim 1, wherein said crosslinking agent comprises an organozirconate selected from the group consisting of zirconium lactate, zirconium diisopropylamine lactate, zirconium triethanolamine lactate, zirconium acetylacetonate, and zirconium ammonium carbonate.

5. The process of claim 1, wherein said crosslinking agent is present in an amount sufficient to supply a zirconium ion concentration in said base gel in the range of about 0.0001 percent to in excess of about 0.0100 percent by weight of said aqueous fluid.

6. The process of claim 1, wherein said retarding agent is present in an amount sufficient to retard the action of said crosslinking agent upon said gelling agent.

7. The process of claim 1, wherein said retarding agent is present in concentrations ranging from about 0.001 to in excess of about 0.600 percent by volume of said base gel.

8. The process of claim 1, wherein said crosslinking agent and said retarding agent are simultaneously admixed with said base gel while introducing the gel into said wellbore.

9. The process of claim 1, wherein incremental increases in the amount of retarding agent admixed with said base gel cause incremental and controllable delay of the reaction between said crosslinking agent and said gelling agent.

10. The process of claim 1, wherein the amount of said crosslinking agent admixed with said base gel is held constant while the amount of said retarding agent admixed with base gel is altered to provide controllable delay of the reaction between said crosslinking agent and gelling agent.

* * * * *